United States Patent
Park

(10) Patent No.: US 10,557,426 B2
(45) Date of Patent: Feb. 11, 2020

(54) ENGINE CONTROL METHOD AND APPARATUS FOR DETERMINING WHETHER INJECTOR MALFUNCTIONS CONSIDERING INFLUENCE OF AIR COMPRESSOR

(71) Applicants: HYUNDAI MOTOR COMPANY, Seoul (KR); KIA MOTORS CORPORATION, Seoul (KR)

(72) Inventor: Su-Young Park, Uiwang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 141 days.

(21) Appl. No.: 15/811,213

(22) Filed: Nov. 13, 2017

(65) Prior Publication Data
US 2018/0171921 A1    Jun. 21, 2018

(30) Foreign Application Priority Data
Dec. 16, 2016 (KR) .................. 10-2016-0172586

(51) Int. Cl.
| | | |
|---|---|---|
| *F02D 41/00* | (2006.01) | |
| *F02D 41/22* | (2006.01) | |
| *F02D 41/40* | (2006.01) | |
| *F02D 41/14* | (2006.01) | |

(52) U.S. Cl.
CPC ..... *F02D 41/0085* (2013.01); *F02D 41/1497* (2013.01); *F02D 41/22* (2013.01); *F02D 41/221* (2013.01); *F02D 41/40* (2013.01); *F02D 41/1498* (2013.01); *F02D 2041/224* (2013.01);
(Continued)

(58) Field of Classification Search
CPC ............ F02D 41/0007; F02D 41/0085; F02D 41/1497; F02D 41/1498; F02D 41/22; F02D 41/221; F02D 41/40; F02D 2041/224; F02D 2041/228; F02D 2250/24; Y02T 10/40; F02B 67/00–06
See application file for complete search history.

(56) References Cited

U.S. PATENT DOCUMENTS 4,667,634 A * 5/1987 Matsumura ......... F02D 41/0085
                                                          123/357
4,779,595 A * 10/1988 Fujimori ............. F02D 41/0085
                                                          123/357
(Continued)

FOREIGN PATENT DOCUMENTS

GB        2526322 A  * 11/2015  ............. F02D 41/22
KR  10-2002-0022356 A    3/2002

*Primary Examiner* — Hung Q Nguyen
*Assistant Examiner* — Mark L. Greene
(74) *Attorney, Agent, or Firm* — Morgan, Lewis & Bockius LLP

(57) ABSTRACT

An engine control apparatus and method in which when an injector malfunction is determined based on a difference in variation of angular velocity of a crankshaft between a plurality of cylinders of a vehicle engine, determining whether the injector malfunctions by avoiding the time when the driving torque of an air compressor is applied or at the time when the influence thereof is reduced, thereby preventing the erroneous determination of whether the injector malfunctions from occurring due to the driving torque of the air compressor connected to the vehicle engine.

12 Claims, 10 Drawing Sheets

(52) U.S. Cl.
CPC .... *F02D 2041/228* (2013.01); *F02D 2250/24* (2013.01); *Y02T 10/40* (2013.01)

(56) References Cited

U.S. PATENT DOCUMENTS

| | | | | |
|---|---|---|---|---|
| 4,915,598 A | * | 4/1990 | Kubis | F02B 63/06 417/380 |
| 2002/0148441 A1 | * | 10/2002 | Tuken | F02D 41/0085 123/436 |

* cited by examiner

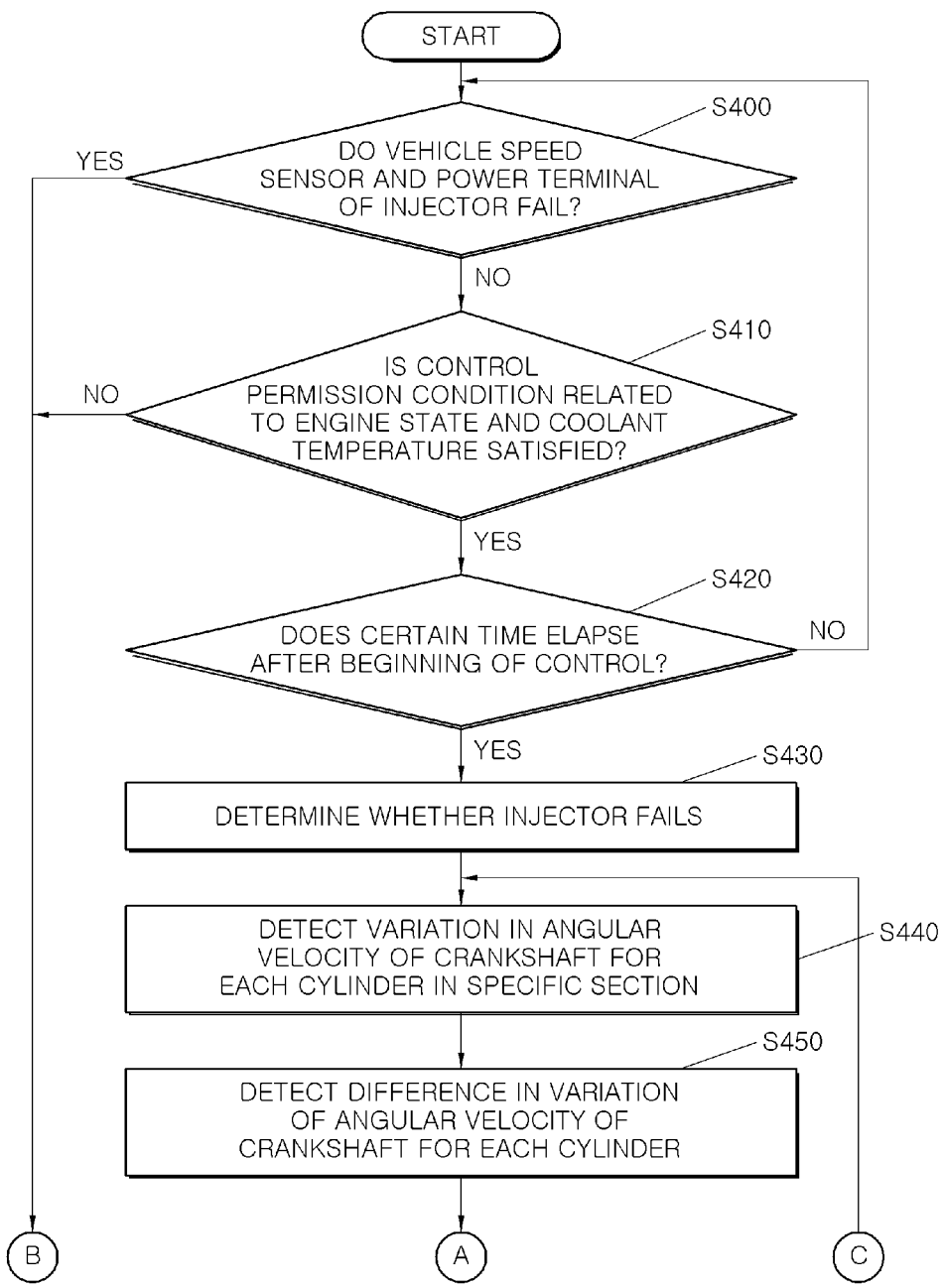

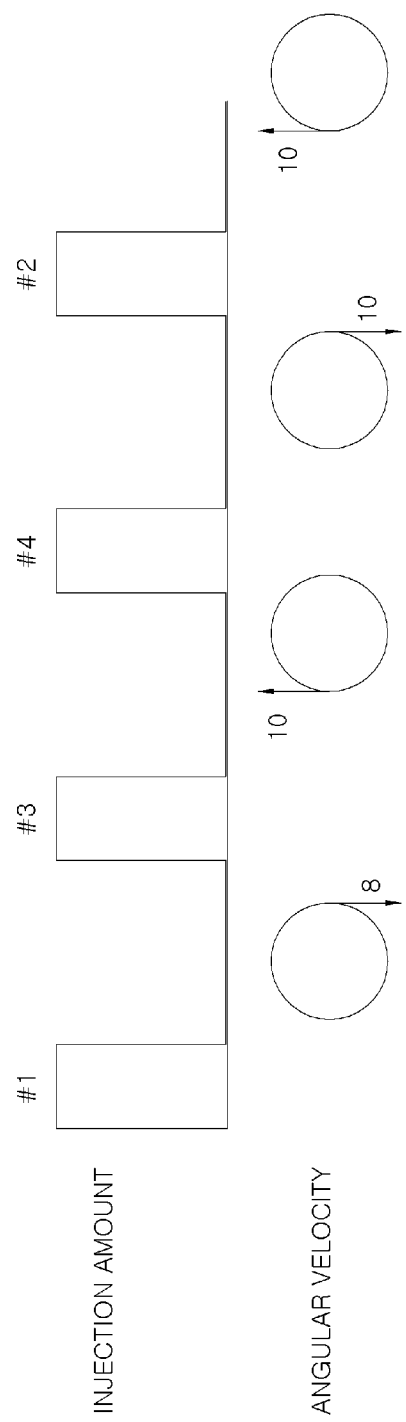

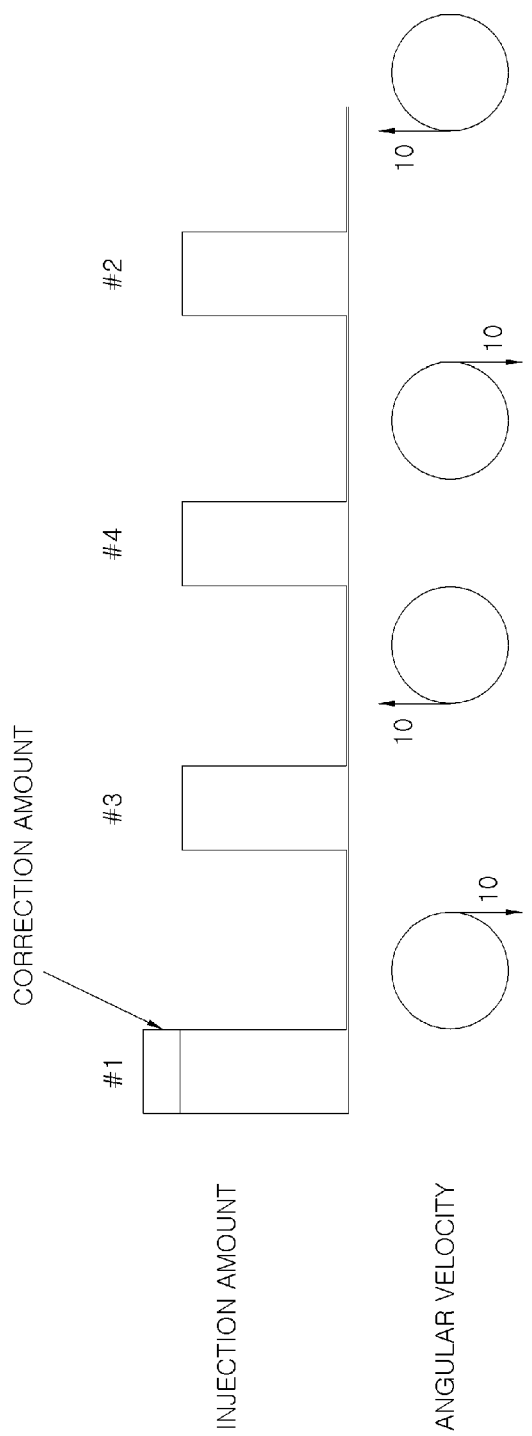

ENGINE CONTROL METHOD AND APPARATUS FOR DETERMINING WHETHER INJECTOR MALFUNCTIONS CONSIDERING INFLUENCE OF AIR COMPRESSOR

CROSS-REFERENCE TO RELATED APPLICATIONS

This application claims priority to Korean Patent Application No. 10-2016-0172586, filed on Dec. 16, 2016, which is incorporated herein by reference in its entirety.

BACKGROUND OF THE INVENTION

Field of the Invention

Exemplary embodiments of the present invention relate to an engine control method and apparatus for determining whether an injector mounted in a vehicle engine fails; and, particularly, to an engine control method and apparatus capable of reducing an influence of an air compressor when determining whether an injector fails.

Description of Related Art

An internal combustion engine, which is the engine of a vehicle, generates power by burning a mixture of outside air and fuel in a combustion chamber, wherein the fuel is injected into the combustion chamber by an injector that controlled by an electronic control unit (hereinafter, referred to as an "ECU"). If the injector fails, the engine is not properly synchronized, in which case a desired driving force may not be obtained and vibration and start-off or no restarting may occur. Accordingly, it is very important to accurately determine whether or not the injector fails.

Meanwhile, in connection with methods of determining whether an injector malfunctions, Patent Document 1 discloses a method of measuring an angular velocity of a crankshaft in a state in which injectors are off in all cylinders of an engine, and uses a variation in angular velocity of the crankshaft for each cylinder and a difference in the variation between the cylinders. That is, when the difference in the variation of the angular velocity of the crankshaft between the cylinders is over a predetermined range, the injector is determined to fail.

Meanwhile, the vehicle includes an air compressor to generate compressed air that is used for a brake and a variety of air systems. The air compressor compresses and discharges air in such a manner that its piston reciprocates by power transmitted from a vehicle engine by engagement therewith. When the air compressor of the vehicle is driven, the load of the compressor is applied to the crankshaft in a certain angle section per revolution of the engine, thereby affecting the angular velocity of the crankshaft. Accordingly, the angular velocity is reduced in the cylinder corresponding to the associated angle section, and hence it may be erroneously recognized that the injector for the associated cylinder fails.

PRIOR ART DOCUMENT

Patent Document (Patent Document 1) Korean Patent Application Publication No. 2002-0022356 (Mar. 27, 2002)

SUMMARY OF THE INVENTION

An embodiment of the present invention is directed to an engine control method and apparatus capable of reducing an influence of an air compressor when determining whether an injector fails based on a difference in variation of angular velocity of a crankshaft.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an engine control apparatus for a vehicle includes a crankshaft position sensor that detects an angularity velocity of a crankshaft of an engine, an air compressor to which driving force of the engine is transmitted from an output end of the engine, an injector for injecting fuel, and a controller that determines whether the injector fails based on a different in variation of angular velocity of the crankshaft between a plurality of cylinders of the engine, wherein the air compressor and the output end of the engine are arranged such that a driving torque of the air compressor is periodically applied immediately after fuel is injected by the injector of the engine.

The driving force of the engine may be transmitted by engaging an input end of the air compressor with the output end of the engine, and the air compressor may be configured to engage with the output end of the engine such that the driving torque of the air compressor is periodically applied immediately after fuel is injected by the injector of the engine.

In accordance with another embodiment of the present invention, an engine control apparatus for a vehicle includes a crankshaft position sensor that detects an angularity velocity of a crankshaft of an engine, an air compressor to which driving force of the engine is transmitted from an output end of the engine, an injector for injecting fuel, and a controller that determines whether the injector fails based on a variation in angular velocity of the crankshaft between a plurality of cylinders of the engine, wherein the controller measures an angular velocity of the crankshaft for each cylinder in each of specific rotation sections when the engine is driven, and determines whether the injector fails based on a variation in angular velocity between the specific rotation sections of each cylinder, and the air compressor and the output end of the engine are arranged such that a driving torque of the air compressor is periodically applied at a time other than the time when the angular velocity is measured by the controller in the specific rotation sections to detect failure of the injector.

The driving force of the engine may be transmitted by engaging an input end of the air compressor with the output end of the engine, and the air compressor may be configured to engage with the output end of the engine such that the driving torque of the air compressor is periodically applied at a time other than the time when the angular velocity is measured by the controller in the specific rotation sections to detect failure of the injector.

The variation in angular velocity between the specific rotation sections may be a difference between an angular velocity in a section where the crankshaft has a maximum angular velocity in each cylinder and an angular velocity in a section other than the section.

In accordance with another embodiment of the present invention, an engine control method determining whether an injector for injecting fuel into an engine of a vehicle fails, the vehicle including an air compressor driven by interlocking with the engine, the engine control method includes determining whether the injector fails based on a variation in angular velocity of a crankshaft for each cylinder of the engine, and determining whether the injector fails when a pressure at a rear end of the air compressor is equal to or less than a certain pressure.

In accordance with another embodiment of the present invention, an engine control method determining whether an injector for injecting fuel into an engine of a vehicle fails, the vehicle including an air compressor driven by interlocking with the engine, the engine control method includes measuring an angular velocity of a crankshaft for each cylinder when the engine is driven, calculating a variation in angular velocity in each cylinder from a difference between angular velocities in specific rotation sections in the measured angular velocity of the crankshaft for each cylinder, calculating a variation in angular velocity of the crankshaft for each cylinder in a section other than the specific rotation sections when a variation in angular velocity in any cylinder exceeds a first reference value, and determining whether the injector fails when a variation in angular velocity of the crankshaft between changed rotation sections exceeds a second reference value.

In accordance with a further embodiment of the present invention, an engine control method determining whether an injector for injecting fuel into an engine of a vehicle fails, the vehicle including an air compressor driven by interlocking with the engine, the engine control method includes measuring an angular velocity of a crankshaft for each cylinder at every one cycle when the engine is driven, calculating a variation in angular velocity in each cylinder from a difference between angular velocities in specific rotation sections in the measured angular velocity of the crankshaft for each cylinder, and determining that the injector fails when a variation in angular velocity in any cylinder exceeds a reference value and a state in which the variation in angular velocity exceeds the reference value is maintained over a predetermined time.

The engine control method may further include, after the calculating a variation in angular velocity in each cylinder, calculating a correction amount of fuel injection based on the calculated variation in angular velocity, the fuel being supplied from the injector to each cylinder, and determining that the injector fails when a correction amount of fuel injection into any cylinder exceeds a reference value and a state in which the correction amount of fuel injection exceeds the reference value is maintained over a predetermined time.

The engine control method may further include determining whether the engine is in an idle state and whether an engine coolant temperature is equal to or higher than a certain temperature, and determining whether a state, in which the engine is in the idle state and the engine coolant temperature is equal to or higher than the certain temperature, is maintained over a certain time, and whether the injector fails may be determined when the state, in which the engine is in the idle state and the engine coolant temperature is equal to or higher than the certain temperature, is maintained over the certain time.

The determining whether the injector fails may include calculating a variation in angular velocity between specific rotation sections of each cylinder, and then calculating a correction amount of fuel injection based on the calculated variation in angular velocity, the fuel being supplied from the injector to each cylinder, and determining that the injector fails when a correction amount of fuel injection into any cylinder exceeds a reference value and a state in which the correction amount of fuel injection exceeds the reference value is maintained over a predetermined time.

The variation in angular velocity between the specific rotation sections may be a difference between an angular velocity in a section where the crankshaft has a maximum angular velocity in each cylinder and an angular velocity in a section other than the section.

When the injector is determined to fail, failure information may be transferred to a driver through a voice message or a video message and a diagnostic trouble code (DTC) related to the failure information may be stored in a storage device in the vehicle.

When it is determined that the injector doesn't fail, an amount of fuel injected into each cylinder may be corrected based on the calculated correction amount of fuel injection.

BRIEF DESCRIPTION OF THE DRAWINGS

FIGS. 5A and 5B are flowcharts illustrating an engine control method according to a further embodiment of the present invention.

FIGS. 6A and 6B are reference views for explaining an injector failure detection method to which the engine control apparatus and method according to the embodiments of the present invention are applicable.

DESCRIPTION OF SPECIFIC EMBODIMENTS

Figure 1:
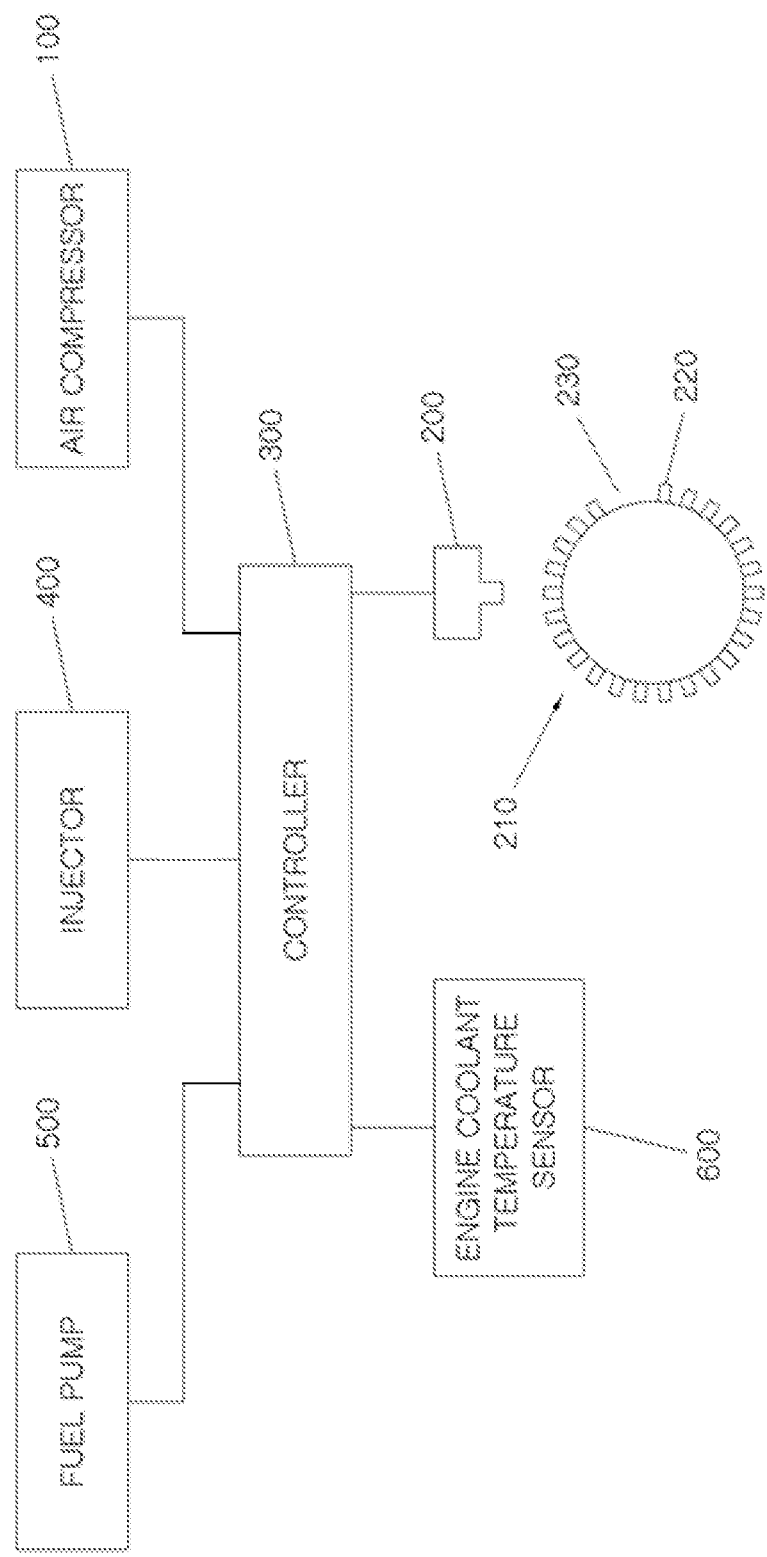
FIG. 1 is a block diagram illustrating a configuration of an engine control apparatus according to an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

First, an injector failure detection method, to which an engine control apparatus and method according to embodiments of the present invention are applicable, will be described with reference to FIGS. 6A and 6B.

The injector failure detection method uses a difference in variation of angular velocity of a crankshaft. Preferably, the injector failure detection method uses a correction amount of fuel injection between cylinders for compensating for the difference in variation of angular velocity of the crankshaft.

The correction of fuel injection between cylinders is a method of detecting a variation in angular velocity of a crankshaft for each cylinder, which is caused by compression, ignition, and combustion after injectors inject fuel into the respective cylinders, by a crankshaft position sensor, and of balancing a cylinder with other cylinders in synchronizing an engine by increasing or decreasing an injection amount into the cylinder when the detected variation is compared between the cylinders and there is a difference in variation of the angular velocity.

For example, as illustrated in FIG. 6A, the crankshaft at specific rotation timings corresponding to actions of cylinders 2 to 4 has the same angular velocity of 10 rad/s, but the crankshaft at a specific rotation timing corresponding to an action of a cylinder 1 has a relatively low angular velocity of 8 rad/s. In this case, an ECU as a controller allows an injection amount into the cylinder 1 to be increased by a correction amount in order to increase the relatively low angular velocity in the cylinder 1, as illustrated in FIG. 6B.

Accordingly, in the correction of fuel injection between cylinders, when a specific injector significantly differs from other injectors in terms of the correction amount of injection, it is determined that a physical abnormality occurs in the injector for the associated cylinder, and the injector for the cylinder is diagnosed as failure.

Meanwhile, since the angular velocity of the crankshaft is fast at the moment when fuel is burnt in the cylinders and it is slow at the moment when the combustion is completed, the angular velocity measured by the crankshaft position sensor is not uniformly maintained. Accordingly, the section where the crankshaft rotates once is presumed as sections divided at regular intervals, and the variation in angular velocity is calculated by comparing it between two specific sections among them. It is preferable to compare a required time in the fastest speed section with a required time in the other section in order to more accurately detect variation in angular velocity.

Table 1 illustrates an example of this method. In a case where the cylinder 1 is abnormal, the required time in a first section where the rotational speed of the crankshaft is fastest and the required time in a second section as the other section are respectively maintained as 40 and 70 in each of the cylinders 2 to 4. On the other hand, the required time in the second section is relatively greater than that in the first section in the cylinder 1. In this case, a time variation (corresponding to the variation in angular velocity) in the cylinder 1 is −90 that is a difference between 40 and 130, and the time variation has a deviation of 45 compared to −45 that is a mean value of time variations in four cylinders.

When the correction of fuel injection between cylinders is performed, a fuel injection amount is corrected to compensate for the deviation. In this case, when the correction amount of injection exceeds a predetermined value, it is determined that the injector fails.

therein. In addition, the gear 111 at the air compressor 100 engages with an engine output-side gear 112, and the air compressor 100 is driven by power transmitted from the engine by engagement of the gears.

Accordingly, the variation in pressure when air is introduced and discharged by the periodic reciprocating of the piston in the air compressor 100 leads to a periodic variation in driving torque of the air compressor 100, thereby affecting the output side of the engine. As a result, this variation affects the angular velocity of the crankshaft of the engine, and it also affects determination of whether the injector fails, as described above.

FIG. 1 is a block diagram illustrating the engine control apparatus according to the embodiment of the present invention, which is capable of reducing an influence of the air compressor 100.

Figure 2:
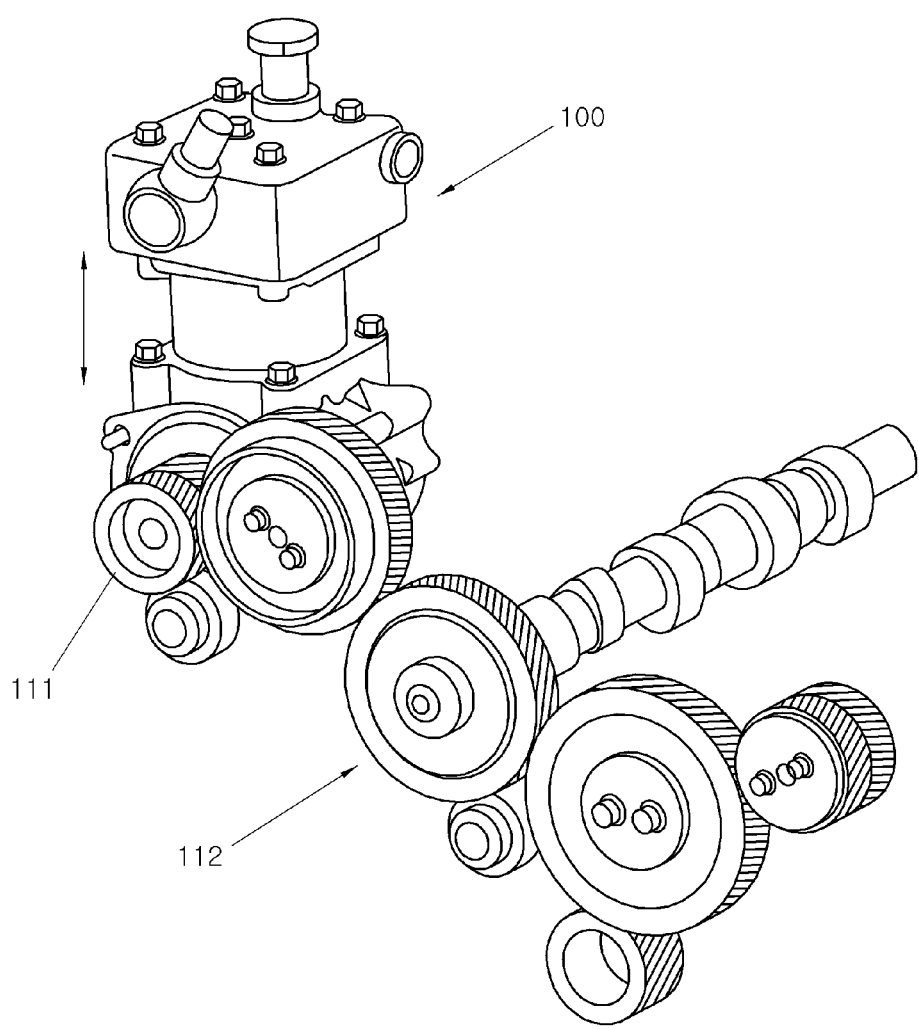
FIG. 2 is a perspective view illustrating a configuration of an air compressor in the engine control apparatus according to the embodiment of the present invention.

As illustrated in FIG. 1, the engine control apparatus according to the embodiment of the present invention includes the air compressor 100 illustrated in FIG. 2, a crankshaft position sensor 200, a controller (ECU) 300, and an injector 400. Preferably, the engine control apparatus includes a fuel supply device, e.g. a high-pressure fuel pump 500 that is controlled by the controller 300 and supplied fuel to the injector, and an engine coolant temperature sensor 600 that detects a coolant temperature of the engine.

The crankshaft position sensor 200 is disposed in the vicinity of a sensor wheel 210 that is coaxially provided in the crankshaft. The sensor wheel 210 has a plurality of teeth 220 installed along the outer periphery thereof. The crankshaft position sensor 200 senses the uneven teeth to detect an angle of rotation and an rpm of the crankshaft, and outputs a pulse-shaped crank signal indicative of the detected result to the controller 300. In this case, the teeth are not formed throughout the circumference of the sensor wheel 210, but are removed from a portion thereof. The crankshaft position sensor 200 recognizes the removed portion as a missing tooth 230. Through such a structure, it is possible to measure the angular velocity of the crankshaft.

The controller 300 receives the crank signal from the crankshaft position sensor 200, calculates the angular velocity of the crankshaft using the received result, and controls the injector 400 and the fuel pump 500 so as to correct an amount of fuel, which is injected by the injector 400 mounted to each cylinder, based on the calculated result. The controller 300 determines whether the injector 400 fails, as described above, based on the information on the engine coolant temperature transferred from the engine coolant

TABLE 1

| | | | Required time for each section in cylinder 1 | | Required time for each section in cylinder 2 | | Required time for each section in cylinder 3 | | Required time for each section in cylinder 4 | |
| | Time deviation in cylinder 1 | Time mean in four cylinders | Time variation in cylinder 1 | First section | Second section | First section | Second section | First section | Second section | First section | Second section |
| --- | --- | --- | --- | --- | --- | --- | --- | --- | --- | --- | --- |
| Normal | 0 | −30 | −30 | 40 | 70 | 40 | 70 | 40 | 70 | 40 | 70 |
| Abnormal | 45 | −45 | −90 | 40 | 130 | 40 | 70 | 40 | 70 | 40 | 70 |

FIG. 2 is a perspective view illustrating an air compressor 100 in the engine control apparatus according to the embodiment of the present invention. As illustrated in FIG. 2, the air compressor 100 is a device that generates compressed air used for a vehicle brake and a variety of air systems. The air compressor 100 is driven by a typical gear 111 and compresses and discharges air by reciprocating of a piston temperature sensor 600. In addition, the controller 300 controls the operation of the air compressor 100 to generate desired compressed air.

According to the embodiment of the present invention, the gear 111 at the air compressor 100 is configured to engage with the engine output-side gear 112 such that the driving torque of the air compressor 100 is applied (i.e., the driving torque is periodically increased over a certain level) immediately after fuel is injected by the injector 400 of the engine. The engine has the highest output torque immediately after fuel is injected by the injector 400. Thus, it is possible to extremely suppress the influence of the driving torque of the air compressor, compared to the other rotation sections of the engine, even though the driving torque of the air compressor 100 is increased over a certain level at the above time.

This may be accomplished by engaging the gear 111 at the air compressor 100 with the engine output-side gear 112 such that the top dead center of the piston in the air compressor 100 almost coincides with the top dead center of the piston in the cylinder of the engine.

Alternatively, according to the embodiment of the present invention, the gear 111 at the air compressor 100 is configured to engage with the engine output-side gear 112 such that the driving torque of the air compressor 100 is periodically applied at a time other than the time when the angular velocity is measured by the controller 300 in specific rotation sections to detect the failure of the injector 400.

As described above, the controller 300 compares an angular velocity (or a required time) between two specific sections from among the rotation sections of the crankshaft in order to obtain a variation in angular velocity of the crankshaft. For example, as illustrated in Table 1, the controller 300 compares an angular velocity (or a required time) between the first section where the angular velocity of the crankshaft is fast and the second section that is one of the other sections. The driving torque of the air compressor 100 is increased at a specific cycle. Therefore, if the time when the driving torque is applied is out of the time when the angular velocity is detected in a section, a portion in which an engine rpm is decreased due to the driving torque of the air compressor 100 is excluded when determining whether the injector fails. Accordingly, it is possible to exclude the influence of the driving torque of the air compressor 100 when whether the injector 400 fails is determined.

This may be accomplished by engaging the gear 111 at the air compressor 100 with the engine output-side gear 112 such that the top dead center of the piston in the air compressor 100 and the top dead center of the piston in the cylinder of the engine are in a specific angle range (e.g. 120 to 150°).

Figure 3A:
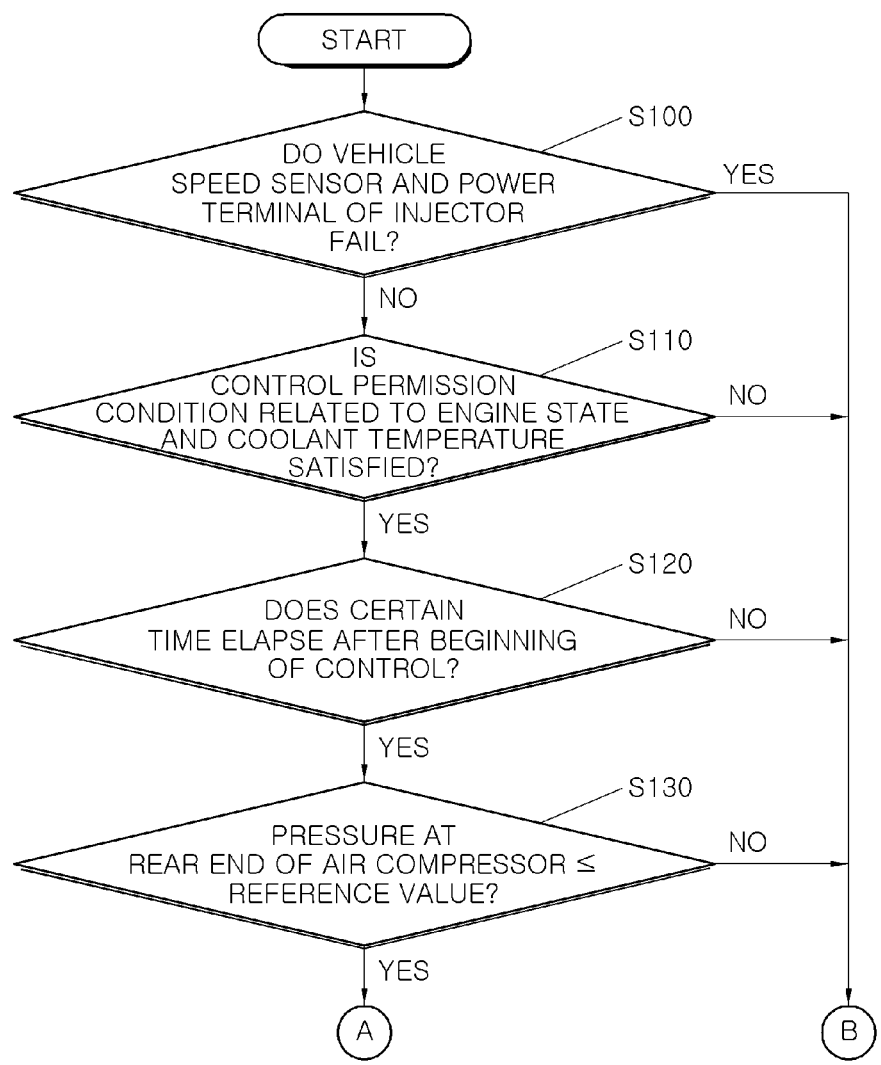
FIGS. 3A and 3B are flowcharts illustrating an engine control method according to an embodiment of the present invention.
Figure 3B:
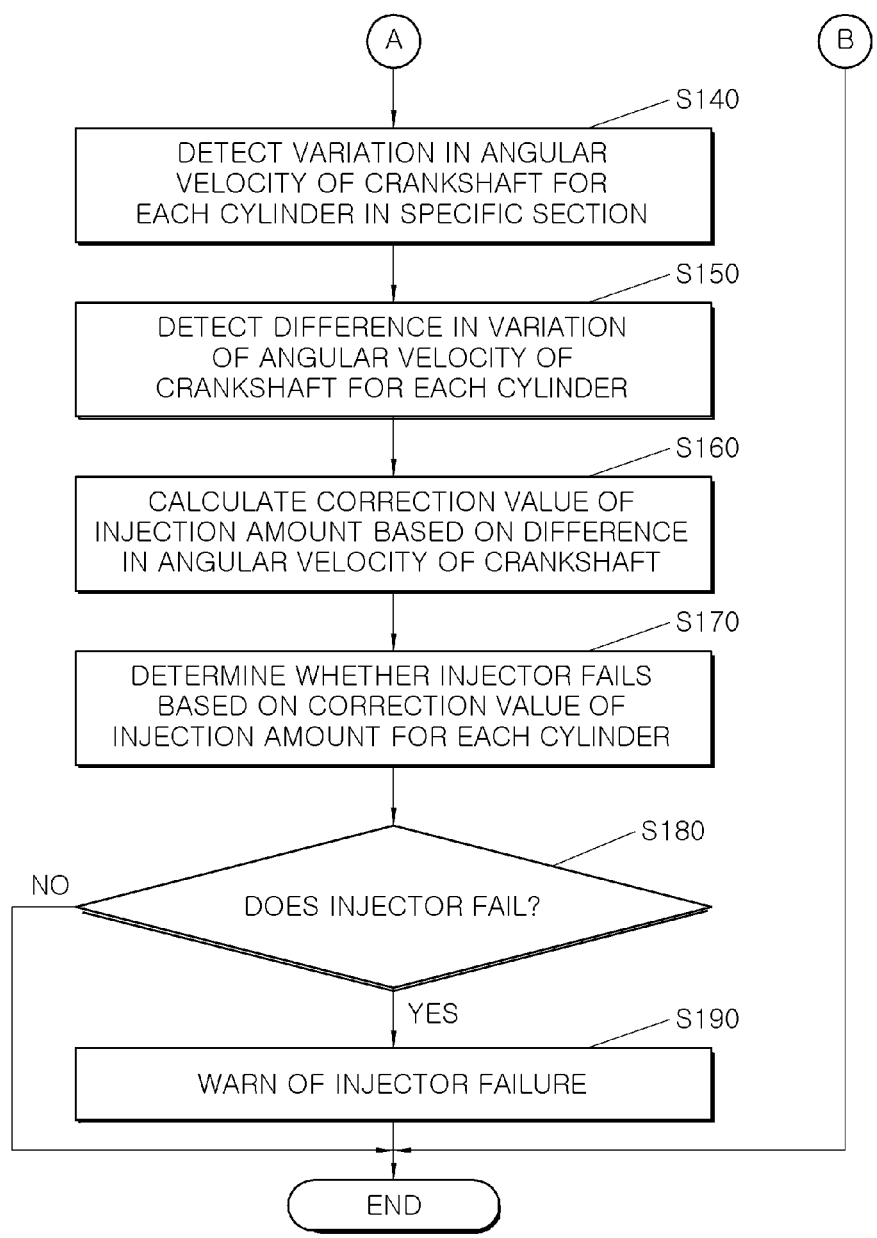

FIGS. 3A and 3B are flowcharts illustrating an engine control method according to an embodiment of the present invention.

As illustrated in FIGS. 3A and 3B, a controller 300 first determines whether a vehicle speed sensor such as a crankshaft position sensor 200 and the power terminal of an injector 400 fail (S100). Whether the parts fail may be checked, for example, through diagnostic information using an ASIC (Application-Specific IC) that is provided in an ECU system for controlling the driving of the parts. When the parts fail, it is fundamentally impossible to determine whether the injector 400 fails or it may be possible to make a wrong decision. Therefore, it is preferable to first determine whether the parts fail.

When it is determined that the vehicle speed sensor and the power terminal of the injector 400 do not fail, the controller determines whether to satisfy a control permission condition related to an engine state and a coolant temperature (S110). In order to accurately determine whether the injector 400 fails, it is preferable to exclude factors, which may affect the angular velocity of a crankshaft, as much as possible, besides the injector 400. Accordingly, it is preferable that the engine be in an idle state and not be in a cold state in which the engine coolant temperature is maintained over a certain temperature (e.g. at a temperature equal to or higher than 70° C.).

In addition, it order to more stably and reliably determine whether the injector 400 fails, the control permission condition mentioned in step S110 is preferably maintained for a certain time (e.g. over 10 minutes) after it is performed (S120). However, the time that is required to fill an air tank by an air compressor 100 is excluded from the maintenance time.

In the embodiment of the present invention, the air compressor 100 includes a pressure sensor at the downstream side thereof The controller 300 receives pressure information at the rear end of the air compressor 100 from the pressure sensor, and determines whether the injector 400 fails only when the pressure at the rear end of the air compressor 100 is equal to or less than a certain pressure. The air compressor 100 is not always operated. Therefore, the controller 300 does not determine whether the injector 400 fails when the pressure at the rear end of the air compressor 100, which is generated while the air compressor is driven to fill the air tank provided in the vehicle with air, exceeds a certain level, and determines whether the injector 400 fails only when the pressure applied to the rear end of the air compressor 100 is removed.

In this case, it is possible to exclude the influence of the driving torque of the air compressor 100 when determining whether the injector 400 fails.

When the pressure at the rear end of the air compressor 100 is equal to or less than the certain pressure, the controller 300 detects a variation in angular velocity of the crankshaft for each cylinder in a specific section to determine whether the injector 400 fails (S140). To this end, it is preferable that the injectors for a plurality of cylinders are sequentially off, and the angular velocity of the crankshaft is detected using the crankshaft position sensor 200. In this case, the specific section is selected as one of a section where the angular velocity is fastest (a section where fuel is injected in the vicinity of the top dead center of the piston) and other sections, and it is possible to detect the variation in angular velocity using an angular velocity in each of the sections or a required time in the section.

When the variation in angular velocity of the crankshaft for each cylinder in the specific section, the controller 300 obtains a mean of the detected angular velocities in a plurality of cylinders, and obtains a difference in variation of angular velocity of the crankshaft for each cylinder with respect to the mean (S150). The controller 300 calculates a correction amount of fuel injection for each cylinder from the difference in variation of angular velocity of the crankshaft in order to compensate for the difference (S160).

After the correction amount of fuel injection for each cylinder is calculated, the controller 300 compares the correction amount of fuel injection with a predetermined reference value. When, among a plurality of cylinders, a cylinder in which the correction amount of fuel injection exceeds the predetermined reference value is present, the controller 300 determines that the injector 400 fails in the cylinder (S170 and S180).

According to the embodiment of the present invention, when it is determined that the cylinder in which the injector 400 fails is present, the controller 300 outputs a voice message through a speaker installed in the vehicle or outputs a video message on a screen such as an instrument panel installed in the vehicle, so as to inform a driver that the injector fails. Through this process, the driver may recognize that a fuel supply system fails and take proper actions such as replacement (S190).

According to the embodiment of the present invention, the controller 300 warns of injector failure and stores a diagnostic trouble code (DTC), which is related to a malfunctioning cylinder and failure of which injection 400 for an associated cylinder, in a storage device in the vehicle. Through this process, it is possible to easily cause in a further maintenance process and to reduce vehicle maintenance cost since only a malfunctioning injector is replaced.

Figure 4A:
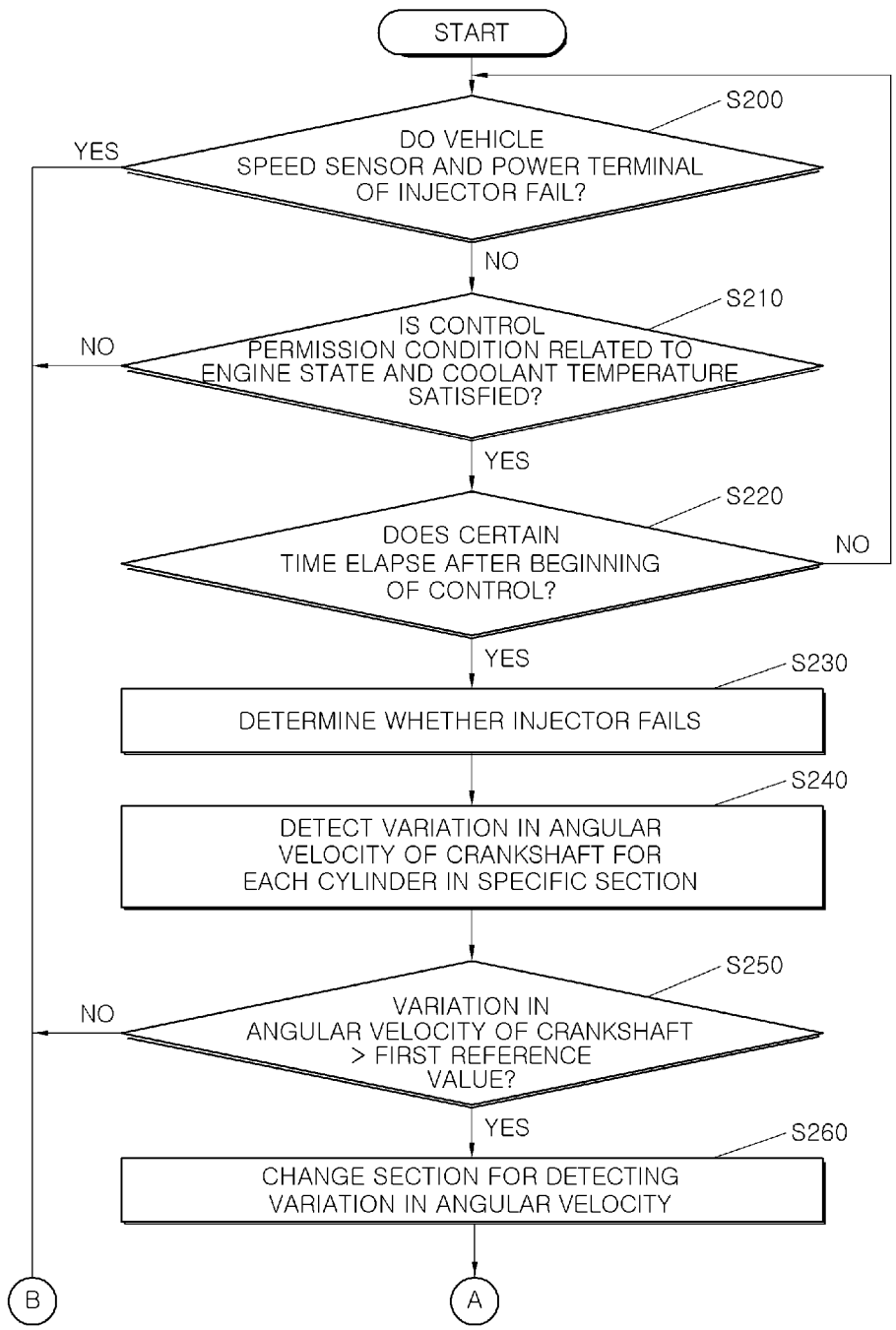
FIGS. 4A and 4B are flowcharts illustrating an engine control method according to another embodiment of the present invention.
Figure 4B:
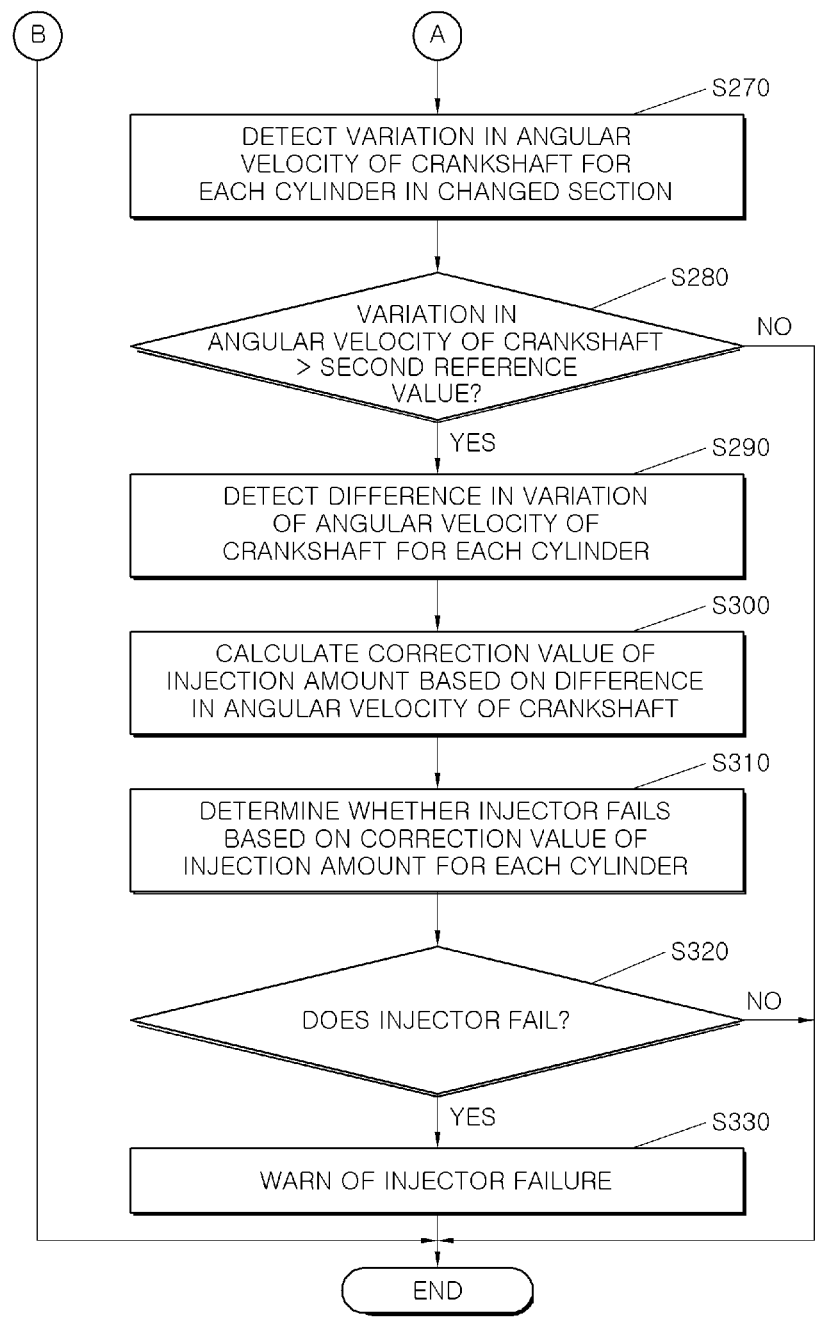

FIGS. 4A and 4B are flowcharts illustrating an engine control method according to another embodiment of the present invention. Detailed description of components and contents in the flowchart of FIGS. 4A and 4B, which are identical to those in the flowcharts of FIGS. 3A and 3B, will be omitted.

Steps S200 to S220 in FIGS. 4A and 4B are steps of determining the control permission condition corresponding to steps S100 to S120 in FIGS. 3A and 3B. When the control permission condition is satisfied in steps 5200 to S220, the controller 300 determines whether the injector 400 fails (S230).

In order to determine whether the injector 400 fails, the controller 300 detects a variation in angular velocity of the crankshaft for each cylinder in a specific section (S240), similar to step S140 in FIGS. 3A and 3B.

The controller 300 determines whether a cylinder, in which the variation in angular velocity of the crankshaft in the specific section exceeds a predetermined first reference value, is present (S250). Here, the first reference value is a threshold value for the variation in angular velocity of the crankshaft to determine whether the injector 400 fails, and is predetermined according to the specification of the injector 400 or the engine mounted in the vehicle. In addition, the section where the variation in angular velocity of the crankshaft is detected in this step preferably uses a section (first section) where the rotational speed of the crankshaft is fastest and one (second section) of other sections except for the section.

When the cylinder, in which the variation in angular velocity of the crankshaft in the specific section exceeds the predetermined first reference value in the specific section, is present, the controller 300 does not determines the failure of the injection, but changes the section for detecting the variation in angular velocity (S260) and detects a variation in angular velocity of crankshaft for each cylinder in the changed section (S270). If the time when the driving torque of the air compressor 100 is applied is present in the section for detecting the variation in angular velocity in step 5240, the variation in angular velocity detected in step S240 may exceed the first reference value due to being subjected to the driving torque of the air compressor 100, in spite of no failure of the injector 400. To prevent this, the controller 300 changes a detection section to recheck whether the injector 400 fails.

To this end, for example, the variation in angular velocity is detected by comparing the angular velocity between third and fourth sections except for the first and second sections used in step S240, or detecting the angular velocity in the first section where the rotational speed is fastest and the angular velocity in the other sections except for the second section to compare them.

The controller 300 determines whether the variation in angular velocity of the crankshaft for each cylinder, which is detected in the changed section, exceeds a predetermined second reference value (S280). If the injector 400 physically fails, there is a difference in variation of angular velocity of the crankshaft between the cylinder in which the injector 400 fails and another cylinder even when the variation in angular velocity of the crankshaft is detected in the changed section.

Here, the second reference value may be equal to or differ from the first reference value depending on the position or combination of changed detection sections.

When the variation in angular velocity of the crankshaft for each cylinder, which is detected in the changed section, is determined to exceed the predetermined second reference value, the controller 300 may directly determine that the injector 400 fails. In addition, similar to steps S150 to S170, the controller 300 may calculate a correction value of fuel injection for each cylinder, based on the value obtained by detecting a difference in variation of angular velocity of the crankshaft for each cylinder, and determine whether the correction value of fuel injection exceeds a predetermined value to determine whether the injector fails (S290 to S310).

When the injector is determined to fail, warning a driver of the failure of the injector 400 and recording a trouble code are equal to those in the embodiment of FIGS. 3A and 3B.

Figure 5B:
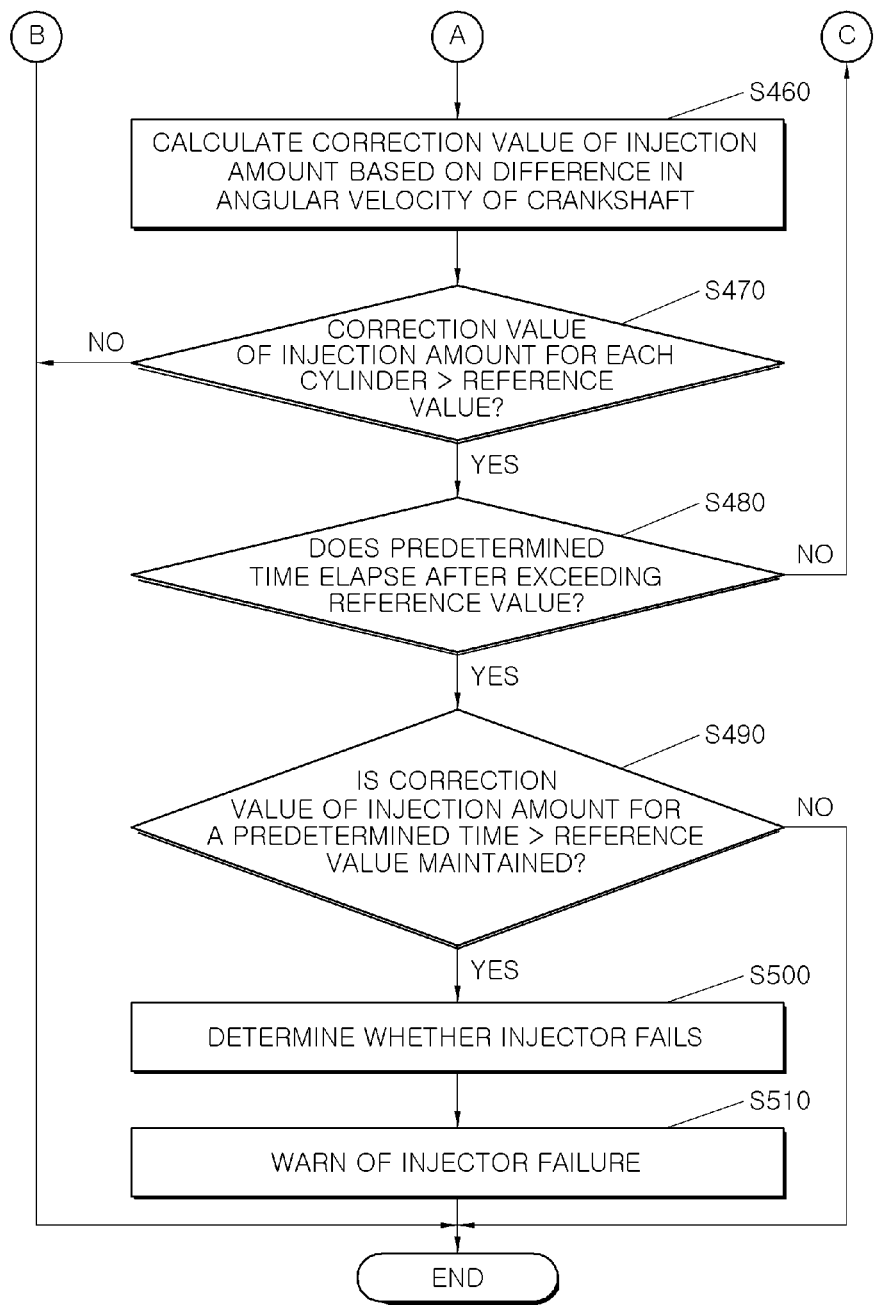

FIGS. 5A and 5B are flowcharts illustrating an engine control method according to a further embodiment of the present invention. Detailed description of components and contents in the flowchart of FIGS. 5A and 5B, which are identical to those in the flowchart of FIGS. 3A, 3B, 4A, and 4B, will be omitted.

Steps S400 to S420 in FIGS. 5A and 5B are steps of determining the control permission condition corresponding to steps S100 to S120 in FIGS. 3A and 3B. When the control permission condition is satisfied in steps S400 to S420, the controller 300 determines whether the injector 400 fails (S430).

In order to determine whether the injector 400 fails, the controller 300 detects a variation in angular velocity of the crankshaft for each cylinder in a specific section (S440), similar to step S140 in FIGS. 3A and 3B, and obtains a difference in variation of angular velocity of the crankshaft for each cylinder, base on the detected variation in angular velocity of the crankshaft for each cylinder (S450).

The controller 300 calculates a correction value of fuel injection for each cylinder from the difference in variation of angular velocity of the crankshaft for each cylinder in order to compensate for the difference (S460), and determines whether the correction value of fuel injection exceeds a predetermined value (S470).

This method is equal to the method of determining whether the injector fails that is described with reference to FIGS. 3A, 3B, 4A, and 4B. In the embodiment of the present invention, the method determines whether the correction value of fuel injection exceeds the predetermined value and is then maintained for a predetermined time (S480 and S490).

As described above, the driving torque of the air compressor 100 is increased by a predetermined level at a specific cycle (has a peak value) to thereby generate a load. Therefore, the influence of the driving torque of the air compressor 100 is maximized in the vicinity of the peak value, whereas it is significantly reduced in the remaining area.

On the other hand, when the injector 400 physically fails, the correction value of fuel injection is not reduced over time, but is consistent over a certain time. Accordingly, the method according to the embodiment of the present invention determines whether the calculated correction value of fuel injection exceeds the predetermined value and is then maintained for a predetermined time. When the above state continues over a certain time, it is determined that the injector 400 fails (S500).

When the injector is determined to fail, warning a driver of the failure of the injector 400 and recording a trouble code are equal to those in the embodiment of FIGS. 3A and 3B (S510).

According to the embodiments of the present invention, it is possible to prevent the erroneous determination of whether the injector fails from occurring due to the variation of driving torque that is caused during operation of the air compressor. Thus, it is possible to suppress an increase in vehicle maintenance cost due to replacement of unnecessary parts.

In accordance with exemplary embodiments of the present invention, it is possible to suppress an increase in vehicle maintenance cost due to replacement of unnecessary parts by preventing an erroneous determination of whether an injector fails from occurring due to a variation of driving torque that is caused during operation of an air compressor.

While the present invention has been described with respect to the specific embodiments, it will be apparent to those skilled in the art that various changes and modifications may be made without departing from the spirit and scope of the invention as defined in the following claims.

What is claimed is:

1. An engine control apparatus for a vehicle, the engine control apparatus comprising:
   a crankshaft position sensor system that includes at least one crankshaft position sensor and detects an angular velocity of a crankshaft of an engine,
   an air compressor to which driving force of the engine is transmitted from an output end of the engine,
   an injector for injecting fuel, and
   a controller that determines whether the injector malfunctions based on a variation in angular velocity of the crankshaft at specific rotation timings corresponding to actions of a plurality of cylinders of the engine,
   wherein the controller measures the angular velocity of the crankshaft at the specific rotation timing corresponding to the action of each of the cylinders when the engine is driven, and determines whether the injector malfunctions based on the variation in angular velocity at the specific rotation timing corresponding to the action of each of the cylinders, and
   the air compressor and the output end of the engine are arranged such that a driving torque of the air compressor is periodically applied at a time other than the time when the angular velocity is measured by the controller in the specific rotation timings to detect malfunctioning of the injector.

2. The engine control apparatus of claim 1, wherein: the driving force of the engine is transmitted by engaging an input end of the air compressor with the output end of the engine; and
   the air compressor is configured to engage with the output end of the engine such that the driving torque of the air compressor is periodically applied at the time other than the time when the angular velocity is measured by the controller in the specific rotation timings to detect malfunctioning of the injector.

3. The engine control apparatus of claim 1, wherein the variation in angular velocity between the specific rotation timings is a difference between an angular velocity in a section where the crankshaft has a maximum angular velocity corresponding to the action of each of the cylinders and an angular velocity in a section other than the section where the crankshaft has a maximum angular velocity.

4. The engine control apparatus of claim 1, wherein the air compressor and the output end of the engine are arranged such that a driving torque of the air compressor is periodically applied immediately after fuel is injected by the injector of the engine.

5. The engine control apparatus of claim 4, wherein:
   the driving force of the engine is transmitted by engaging an input end of the air compressor with the output end of the engine; and
   the air compressor is configured to engage with the output end of the engine such that the driving torque of the air compressor is periodically applied immediately after fuel is injected by the injector of the engine.

6. An engine control method determining whether an injector for injecting fuel into an engine of a vehicle malfunctions, the vehicle comprising an air compressor driven by interlocking with the engine, the engine control method comprising:
   determining whether the injector malfunctions based on a variation in angular velocity of a crankshaft at a specific rotation timing corresponding to an action of each of the cylinders of the engine; and
   determining whether the injector malfunctions when a pressure at a rear end of the air compressor is equal to or less than a certain pressure.

7. An engine control method determining whether an injector for injecting fuel into an engine of a vehicle malfunctions, the vehicle comprising an air compressor driven by interlocking with the engine, the engine control method comprising:
   measuring an angular velocity of a crankshaft at specific rotation timings corresponding to actions of a plurality of cylinders of the engine at every one cycle when the engine is driven;
   calculating a variation in angular velocity of the crankshaft at the specific rotation timing corresponding to the action of each of the cylinders from a difference between angular velocities in the specific rotation timings corresponding to the actions of each of the cylinders; and
   determining that whether the injector malfunctions based on a correction value of an injection amount of the fuel for each of the cylinders.

8. An engine control method determining whether an injector for injecting fuel into an engine of a vehicle malfunctions, the vehicle comprising an air compressor driven by interlocking with the engine, the engine control method comprising:
   calculating a variation in angular velocity of the crankshaft at specific rotation timings corresponding to actions of a plurality of cylinders of the engine;
   after the calculating the variation in angular velocity of the crankshaft, calculating a correction amount of fuel injection that allows the calculated variation in angular velocity to be reduced, the fuel being supplied from the injector, which is provided for each of the cylinders, to each of the cylinders; and
   determining that the injector malfunctions when the correction amount of fuel injection into any of the cylinders exceeds a reference value and a state in which the correction amount of fuel injection exceeds the reference value is maintained over a predetermined time.

9. The engine control method of claim 8, further comprising:
- determining whether the engine is in an idle state and whether an engine coolant temperature is equal to or higher than a certain temperature; and
- determining whether a state, in which the engine is in the idle state and the engine coolant temperature is equal to or higher than the certain temperature, is maintained over a certain time,
- wherein whether the injector malfunctions is determined when the state, in which the engine is in the idle state and the engine coolant temperature is equal to or higher than the certain temperature, is maintained over the certain time.

10. The engine control method of claim 8, wherein the variation in angular velocity between the specific rotation timings is a difference between an angular velocity in a section where the crankshaft has a maximum angular velocity corresponding to the action of each of the cylinders and an angular velocity in a section other than the section where the crankshaft has a maximum angular velocity.

11. The engine control method of claim 8, wherein, when it is determined that the injector does not malfunction, an amount of fuel injected into each of the cylinders is corrected based on the calculated correction amount of fuel injection.

12. The engine control method of claim 8, wherein, when the injector is determined to malfunction, malfunctioning information is transferred to a driver through a voice message or a video message and a diagnostic trouble code (DTC) related to the malfunctioning information is stored in a storage device in the vehicle.

* * * * *